Feb. 4, 1941.  A. P. McDONALD  2,230,306
VITREOUS CLAY UNDERGROUND CONDUIT
Filed Jan. 19, 1939
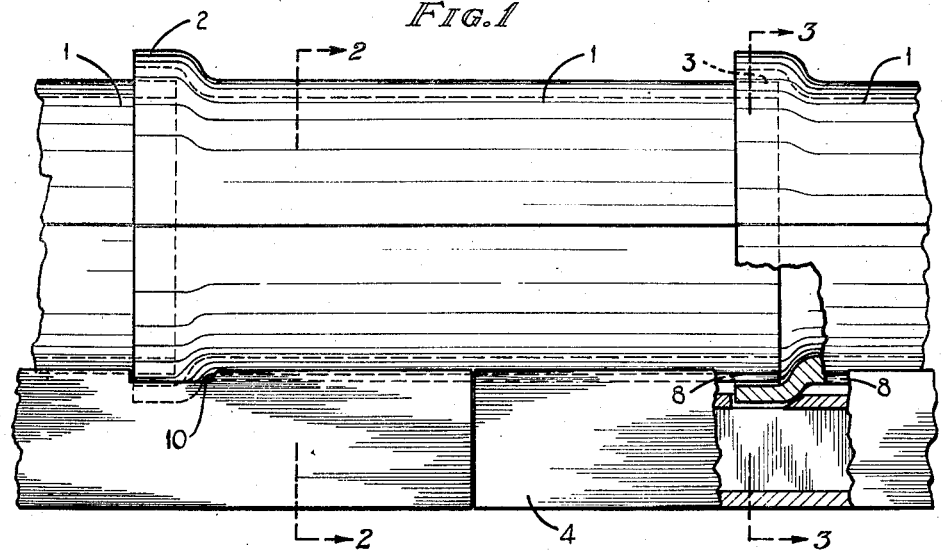
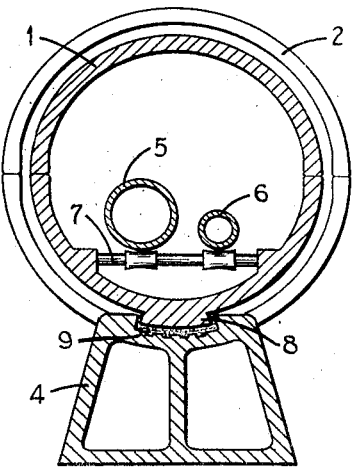 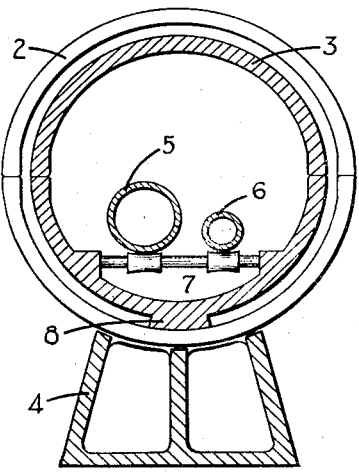
ALBERT P. McDONALD
INVENTOR
by Arthur Robert
ATTORNEY Patented Feb. 4, 1941

2,230,306

UNITED STATES PATENT OFFICE 2,230,306

VITREOUS CLAY UNDERGROUND CONDUIT

Albert P. McDonald, Louisville, Ky.

Application January 19, 1939, Serial No. 251,721

4 Claims. (Cl. 138—48)

This invention relates to improvements in vitreous-clay conduits such as are largely used underground to encase the piping of steam-transmission and other systems. Conduits of this character are usually shipped to the job in the form of short cylindrical sections, which, at the job, are split longitudinally into upper and lower halves. The lower halves are successively laid end to end on the upper concaved surface of a sectional base drain resting upon the floor of the trench in which the conduit is to be buried. The upper halves are placed over and cemented or otherwise secured to the lower halves, after the pipes, pipe supports and insulating material have been installed, whereupon the trench is filled in.

In conduits containing two or more pipes, which present different load problems, an eccentric load condition, exerting a rotational torque on the walls of the conduit, is often created. I have found that this torque is responsible for some of the conduit breakages heretofore attributed to other causes.

The principal object of this invention is substantially to reduce, if not eliminate, breakages of this character.

In some conduits, one end of each section is flared to fit over the unflared end of the adjacent section, and thus forms a bell and spigot joint between sections. Another important object of this invention is to provide simple and inexpensive means for centering the spigot end of one section relatively to the bell end of the adjacent section.

A further object is to provide a novel form of means which functions both to reduce torque breakages and to center adjacent sections.

The invention is illustrated in the accompanying drawing, wherein:

Figure 1 is a partly broken side elevation of conduit sections constructed in accordance with the invention and mounted on a base drain; and Figures 2 and 3 are sections taken along lines 2—2 and 3—3 respectively of Figure 1.

The conduit illustrated includes a number of conduit sections 1, each having bell and spigot ends 2 and 3 respectively, supported in end-to-end relationship on a base drain 4 composed of longitudinal open-ended sections. The interior of the conduit conventionally contains a pipe system which, as illustrated, is composed of large and small pipes 5 and 6 supported on a suitable form of cradle 7. In accordance with the usual practice, the interior of the conduit may be filled with a suitable insulating material, not shown.

For explanation purposes, it may be assumed that the large and small pipes 5 and 6 are respectively used to convey steam from, and to return condensate to, a heating plant. With an arrangement of that character, the pipes will normally have different rates and degrees of expansion and contraction. These factors, coupled with other factors, such as their difference in weight, will create a rotational torque which tends to rotate the conduit in a counter-clockwise direction. This torque, I have discovered, is responsible for many of the conduit breakages which have heretofore been attributed to other causes. The precise manner in which it operates is not clearly understood, but it is believed that the rotational torque is either not uniformly applied, or not uniformly resisted, throughout the length of any one section. Consequently, it tends to twist or distort the section about its longitudinal axis and, in doing so, creates additional stresses which, either alone or in combination with other normally present stresses, are sufficient to effect breakage.

Water hammer is another factor which is responsible for conduit breakages. Where water hammer is encountered, the lower half of the conduit is often laterally displaced relatively to the upper half. This lateral displacement reduces the amount of surface contact between halves and often renders the remaining contact uneven. As a result, the upper half particularly becomes more readily subject to breakage.

Whatever the reason may be, I have found that breakages of this general character may be greatly reduced, if not entirely eliminated, by interlocking the conduit rigidly to the base drain through a tongue and groove connection. Accordingly, the bottom of each conduit section is provided with a longitudinal tongue or rib 8, while the top of each base-drain section is provided with a rib-receiving groove. The rib and groove preferably are tapered upwardly or flared outwardly and inwardly respectively to a slight extent, say 10°, but the widest part of the rib is dimensioned to clear the narrowest part of the groove in order to permit the vertical insertion of the rib into the groove. If desired, the concave bottom wall of the groove may be longitudinally serrated as shown, while the bottom wall of the rib should be convexly shaped to conform thereto. The rib may be discontinuous but, as shown, is arranged to extend continuously from the flare at the bell end of the section to the spigot end thereof.

In laying a conduit system of this character, a series of base-drain sections 4, each having transverse notches 10 conventionally shaped to receive the bell of a conduit section, are placed in end-to-end relation on the floor of a trench dug to receive the system. The conduit sections 1 are longitudinally split and the lower halves 10 thereof placed in end-to-end relation on the base drain. Thereafter the pipe system is installed and, if desired, insulated, the upper halves of the conduit sections placed over and cemented or otherwise secured to the lower halves to complete the system and the trench then filled in.

In positioning the lower halves of the conduit sections, the bell flare of one half is placed in the notch 10 of the corresponding base-drain section, while the rib 8 of the same half is vertically inserted into the coterminous grooves 9 of the same base-drain section and the next adjacent section. The clearance space of the rib-groove connection is filled with a grout or fine-sand cement, which, upon hardening, rigidly interlocks the parts not only against relative rotation and lateral displacement, but also against vertical separation. With one lower half in position, the next half is positioned with its spigot end extending into the bell end of the previously laid half and with its bell flare extending into the bell-receiving notch of the next adjacent base-drain section. In this connection, it will be noted that the rib 8 at the spigot end of this latter section, engages the bell of the previously laid section. This rib, in the bell-engaging area at least, is dimensioned to effect the proper centering of the spigot end of its section and the adjacent bell end of the connection section. The rib thus additionally provides an easy and convenient means for maintaining the proper alignment of successive sections as the laying of the system progresses.

Now having described my invention, I claim:

1. In a conduit system: a base-drain section; a conduit section supported thereon; cooperating tongue-and-groove means on said sections; and means in the groove for interlocking the tongue therein, the tongue and groove otherwise being vertically separable.

2. In a conduit system: a base-drain section; a conduit section supported thereon; cooperating tongue and groove means on said sections, said tongue being outwardly flared and said groove being outwardly tapered, the widest portion of the tongue being smaller than the narrowest portion of the groove to facilitate vertical separation of the sections; and means for interlocking said tongue within said groove.

3. In a conduit system: a base-drain section having an upwardly tapered longitudinal groove in its upper face; a conduit section, having an upwardly tapered longitudinal rib along its bottom face, supported on said base-drain section with its rib extending into said groove, the widest portion of the rib being slightly smaller than the narrowest portion of the groove; and means for rigidly interlocking said rib within said groove.

4. In a conduit system: a base drain having a conduit interlocking groove; a series of conduit sections, each having bell and spigot ends, supported on the base drain with the spigot end of one section extending into the bell end of the next section; rib means on the bottom of each section extending downwardly into the underlying base-drain groove to provide a vertically separable tongue-and-groove relation between the sections and the base drain and extending horizontally into the bell of an adjacent section to center the bell and spigot connection therebetween; and means within the groove for interlocking the tongue therein.

ALBERT P. McDONALD.